(12) United States Patent
Kelly

(10) Patent No.: US 6,681,210 B2
(45) Date of Patent: Jan. 20, 2004

(54) MODULAR SERVICE PAYROLL SYSTEM

(76) Inventor: Andrew Jeffrey Kelly, 3610 W. Pioneer Pkwy., Suite 211, Arlington, TX (US) 76013

(*) Notice: Subject to any disclaimer, the term of this patent is extended or adjusted under 35 U.S.C. 154(b) by 163 days.

(21) Appl. No.: 09/946,028

(22) Filed: Sep. 4, 2001

(65) Prior Publication Data

US 2003/0046196 A1 Mar. 6, 2003

(51) Int. Cl.[7] ............................................. G06F 17/60
(52) U.S. Cl. ........................... 705/32; 705/11; 705/30
(58) Field of Search ............................ 705/30, 31, 32, 705/34, 14, 8, 9, 11

(56) References Cited

U.S. PATENT DOCUMENTS

| | | | |
|---|---|---|---|
| 4,819,162 A | * 4/1989 | Webb et al. | 705/32 |
| 5,600,554 A | * 2/1997 | Williams | 705/1 |
| 6,347,306 B1 | * 2/2002 | Swart | 705/32 |
| 2001/0034676 A1 | * 10/2001 | Vasic | 705/30 |
| 2002/0082987 A1 | * 6/2002 | Wilson | 705/39 |
| 2002/0099659 A1 | * 7/2002 | Swentor | 705/44 |

FOREIGN PATENT DOCUMENTS

WO     WO 01/57813 A1 * 9/2001

OTHER PUBLICATIONS

Derwent Publication, Payroll Administration system debits pooled clearing account and sub–account of authorized employee, by amounts of payments authorized against funds in accounts. 2002–600219. Copyright 1999.*
A Quick Breakdown of Strategic Pay, Williams et al. Workforce 78: 72–75, 1999.
Get What You Pay For: Performance, Contracting Business, Mar. 2001, McCart.
100–Percent Bonuses Mean High Pay—Plus Low Labor Costs, Marks, Workforce, Jun. 2001: 112–114.
Can Pay for Performance Really Work, Wiscombe, Aug., 2001: 28–34.

* cited by examiner

Primary Examiner—James S. McClellan
(74) Attorney, Agent, or Firm—Lynn E. Barber

(57) ABSTRACT

A payroll system and method for determining compensation of employees for work during a pay period on one or more projects. The invention utilizes minimum employee compensation amount and the unit rate compensation amount for each employee, and compares the difference between these amounts for each employee with the outstanding debit account amount for that employee, and then determines the employee's pay for the pay period and whether the employee's debit account amount should be adjusted. Additional modules are provided for another employer business operations.

12 Claims, 1 Drawing Sheet

MODULAR SERVICE PAYROLL SYSTEM

BACKGROUND OF THE INVENTION

1. Field of the Invention

This invention relates to a software system for employers' determination of compensation levels for employees.

2. Description of the Related Art

In many fields, such as the construction industry, where contractors utilize field employees to provide a wide variety of customized services to various customers, it is often difficult to determine a level of compensation for the field employees that is closely correlated with the particular services performed by each employee, is sufficiently rewarding to efficient, productive employees to maximize employee retention and maximize efficiency, is correlated to and within the employer's costs for providing the services, and is appropriately adjusted to take account of over-time worked by the employee to meet government requirements. Paying employees strictly on a per hour basis tends to reward employees who take a long time to perform a service rather than rewarding efficiency, and payment that is not tailored to the value of the particular service or for extra services tends to result in lower employee performance levels.

Attempts have been made to overcome these limitations. In some fields, contractors make payments on a per hour basis, plus additional payment for extra services, such as in return for a customer lead (commonly known as a "spiff") and for over-time. Some companies rely heavily on bonus cash payouts to motivate workers who are otherwise paid relatively low salaries. Other attempts based somewhat on a traditional piece-work system must be carefully monitored so that the amount paid meets minimum wage and overtime requirements. Piece-work rewards volume of work and not quality of work.

The performance-based pay system of Tom McCart (Contracting Business, March 2001, pages 52–5) utilizes production goals determined from sales projections and geographic area information, along with technician self-tracking to measure and compare technician's performance and other employee motivational techniques, to determine pay raises.

In order to be sure of their costs of providing particular services and to aid in determination of how much to charge customers, some industries such as the plumbing industry and the HVAC industry have promulgated detailed flat-pricing databases containing thousands of estimated costs of labor and materials for particular projects. Thus, a plumbing and HVAC contractor can consult the databases to obtain an estimated cost for a particular repair or installation having a specific assembly, with information generally provided based on the material and labor unit cost. The contractor can use this cost estimate and make a determination of what to pay the employees, assuming that the work will all be done at a standard non-overtime rate; however, the employer must be careful to monitor the actual amount of time that the employees work to be sure that the minimum wage is paid and that appropriate overtime pay is paid. This system does not provide any mechanism for rewarding employees who are more efficient and do better work than average employees. This system can work with any trade's material and labor database.

It is therefore an object of the invention to provide a system for employee compensation that revolves around the employee performing service work and being subsequently compensated with a premium based on performance. Performance as used here includes work performed expediently and properly the first time. With the system of the invention, high performing employees can routinely make 20–30% more than other employees, while at the same time, the employers' profits are increased.

Other objects and advantages will be more fully apparent from the following disclosure and appended claims.

SUMMARY OF THE INVENTION

The invention herein is a payroll system and method for determining compensation of employees for work during a pay period on any of one or more projects. The invention utilizes a base employee compensation amount and a unit rate compensation amount for each employee, and compares the difference between these amounts for each employee with the outstanding debit account amount for that employee, and then determines the employee's pay for the pay period and whether the employee's debit account amount should be adjusted. Additional optional modules are provided in the invention that may be used for other employer business operations.

Other objects and features of the inventions will be more fully apparent from the following disclosure and appended claims.

DETAILED DESCRIPTION OF THE INVENTION AND PREFERRED EMBODIMENTS THEREOF

Figure 1:
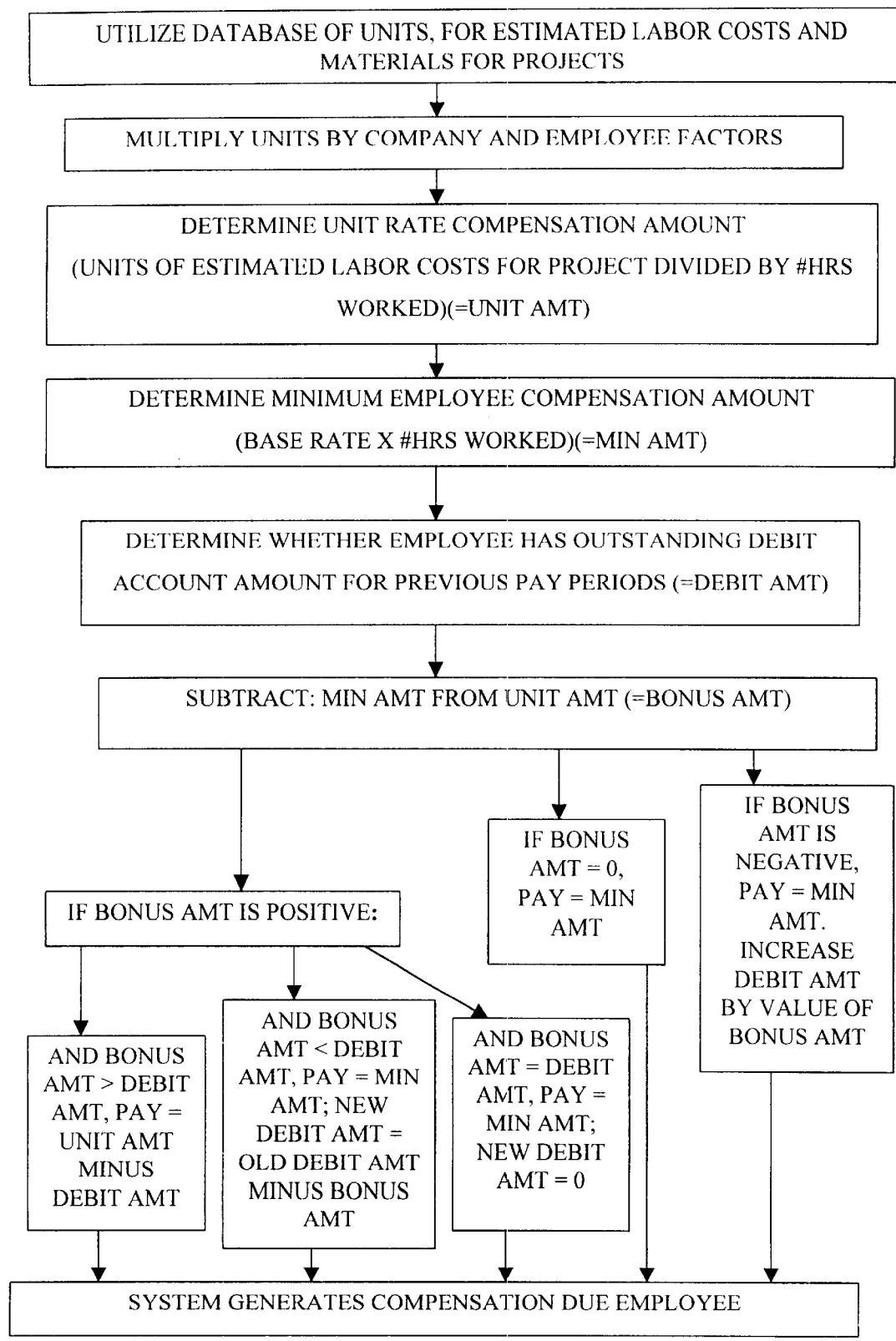
FIG. 1 is a flow-chart the main steps of the method of the invention.

The present invention provides a modular service payroll software system for determining compensation of employees for work during a pay period on one or more projects and the method of determining employee compensation for services rendered by the employee.

As used herein, an "employee" may be any worker who is to be paid for his or her services, and may include workers working on a contractual basis. The term "employee" may also be one or more employees who together complete a project. Allocation of pay to individual employees when there is more than one employee on a project is calculated by the employee and/or the employees agree on a percentage split. The system of the invention can track multiple employees on a single project.

As used herein, the term "project" means a particular goal to be finished by an employee or a group of employees. For example, in the plumbing industry, an example of a project might be the plumbing services required for a shower unit on the second floor of an apartment.

The "unit rate compensation amount" is a product of database units times a company factor times an employee factor, each of which terms is defined below.

The term "unit" or "database unit" is an assigned value, preferably from a database, for performance of a specific task, such as motor replacement or air-conditioner system charge. For each project, the system of the invention provides a standard unit that is used in the invention to calculate what an employee will be paid for completion of the project or projects. For each project, the system of the invention tracks and uses the amount of actual labor the employee spends on the project and the unit from the trade database as a starting point in the determination of unit rate compensation amount.

A "company factor" (also called "comp rate") is the factor that a particular company uses to multiply times the number of database units worked by each employee as part of calculation of the "unit rate compensation amount" (see below). This company factor may be adjusted periodically by the company to reflect the company's overall efficiency and productivity. An example of calculation of the company factor for a particular company is set forth in Example 8.

Finally, to determine the "unit rate compensation amount" for each employee, an employee factor is used to adjust for such things as employee status and extra responsibilities or productivity. This employee factor essentially is used to modify the company factor for particular employees, based on longevity, managerial duties the employee may perform, training or other accomplishments which separate the employee from his peers. Thus, for new employees, the employee factor may be less than one, effectively reducing the new employee's unit rate compensation amount, while for a managerial employee with special duties, the employee factor would likely be greater than one.

The term "compensation base rate" or "base rate" means the minimum amount an employee is paid per hour using the invention, which is always at least as much as required by the law(s) applicable to the jurisdiction of employment. For example, a junior level employee might have a base rate of $10.00 per hour, while a more senior person's base rate might be $15.00 per hour. Under current law, employees are paid time-and-a-half for overtime, which is over 40 hours per week in most states. The invention herein can be modified for any type of overtime requirement or other regulatory factors that might affect how much an employee is required to be paid. The "minimum employee compensation amount" is thus the employee's base rate times the number of hours worked by that employee during a particular pay period.

The term "extra time" relates to time used to calculate remuneration to be added to the employee's pay for work performed by the employee for which the customer is not billed, whether the employee is paid under the unit rate compensation amount calculation or the minimum employee compensation amount calculation. If the extra time for an employee is expected and normal in the course of operating the business, such as training, equipment maintenance, cleaning, taking inventory and the like, payment for the extra time is added as a bonus payment to the employee. If the extra time is inexcusable extra time, under most company's systems, the employee's performance bonus pay that might otherwise be received is likely to be negatively affected.

Thus, the payroll and accounting system of the invention for determining compensation of employees for work during a pay period on one or more projects comprises:

a) an interface to a database comprising information on units of estimated labor costs for completing each of said projects;

b) means of determining a company factor, and an employee factor for each employee;

c) an interface for entering project information for each project on which employees work, including units, employee information, information on projects completed by each employee, hours worked on each project by each employee, overtime information for each employee and compensation base rate for each employee;

d) one or more programs, which calculate minimum employee compensation amount based on each employee's compensation base rate times the number of hours worked by the employee on the project, and which calculate the unit rate compensation amount for each project undertaken by each employee based on the units of estimated labor costs for each said project, times the company and employee factors;

e) means for determining whether the employee has an outstanding debit account amount for previous pay periods; and f) means for utilizing the minimum employee compensation amount, the unit rate compensation amount for each employee, and the outstanding debit account amount for that employee to determine each employee's pay for the pay period and to determine whether each employee's debit account amount should be adjusted.

The method of the invention of determining employee compensation for services rendered by the employee as shown in FIG. 1, comprises:

a) providing an interface to an accessible database for storing data on units of estimated labor costs for providing services on each of one or more projects;

b) providing a compensation base rate for each employee;

c) determining a minimum employee compensation amount for each project undertaken by each employee based on the employee's compensation base rate times the number of hours worked by the employee on the project;

d) determining a unit rate compensation amount for each project undertaken by each employee utilizing units allocated to each project, and factors specific for the employee's employer company and the employee;

e) determining whether each employee has an outstanding debit account amount related to previous work for which the employee was paid an amount greater than the employee would have earned if he was paid the unit rate compensation amount;

f) subtracting the minimum employee compensation amount from the unit rate compensation amount to yield a bonus amount; and g) if the bonus amount is positive and greater than the debit account amount, paying the employee the unit rate compensation amount minus the debit account amount, but paying the employee no lower than the minimum employee compensation amount; or h) if the bonus amount is positive and less than the debit account amount, paying the employee the minimum employee compensation amount, and adjusting the debit account amount for the employee to be equal to the outstanding debit account amount minus the bonus amount; or i) if the bonus amount is positive and equal to the debit account amount, paying the employee the minimum employee compensation amount, and adjusting the debit account amount for the employee to be zero; or j) if the bonus amount equals zero, paying the employee the minimum employee compensation amount; or k) if the bonus amount is negative, paying the employee the minimum employee compensation amount and adjusting the debit account amount by adding the bonus amount to the debit account amount.

In addition, modules may be added to the system, such as for production of standard reports produced for particular employees, services provided, and customers, to track earned time off by each employee, to track gasoline usage of particular employees or jobs, to provide a tool account from which employees may earn the ability to purchase tools, for payrolls for production of paychecks, for determining, withholding and paying payroll taxes, and any required fees; for determining and paying sales tax due to governmental authorities; and to enable tracking (dispatch) of completion of particular employee services to enable timely assignment of employees to new projects.

In the system of the invention as described in more detail below, each employee has an hourly base rate of payment, is paid overtime (currently required at 1.5×the base rate for over 40 hours per week), and has a "debit account amount" (essentially a negative amount "in the bank") to take account of debit account amounts as discussed herein, the latter of which may affect the employee's pay if the employee works less efficiently than the unit rate standard amounts.

Under the system of the invention, the employee is always paid at least his base rate for the non-overtime work week (e.g., 40 hours by current law) plus time-and-a-half for overtime for the week under current regulations. If the employee is less efficient than the standard rate so that calculation of the employee's base rate times the number of hours actually worked on a particular project exceeds the unit rate compensation amount for that project, the employee is still paid at the base rate plus time-and-a-half for any overtime for that pay-period, but his "debit account amount", which is simply a running negative balance that keeps track of the employee's performance, is increased by the excess over the unit rate compensation amount that is paid to the employee for completion of a particular project. Except for pay owed an employee for work during the current pay period, there is never a positive balance in the employee's debit account of amounts owed the employee for past work; in other words, the employee is paid all amounts owed him under the system of the invention during the regular pay period during which the employee would normally be paid. The employee never receives a paycheck for less than his base-amount plus time-and-a-half. He also does not have an actual amount taken from his base rate calculated wages for this debit account amount. The debit account amount is only subtracted from any excess calculated amount (over the base rate times hours worked plus time-and-a-half) for future pay-periods, if the employee works more efficiently than the unit rate (completes a project more rapidly so that, except for debit account amount calculations, he would be paid more than his base rate); or unless and until the employee has some other bonus due to him, such as a commission or spiffs, from which bonus, past debit account amounts could be deducted. For each pay-period when the employee is due a bonus or payment that is in excess of the base rate plus time-and-a-half for overtime, such as for especially efficient work that week, the employee will have the amount of any debit account amount that is accrued from previous pay-periods, deducted from that pay-period's bonus or extra payment, with the company having the option to defer or eliminate the negative balance. The amount paid to the employee for a pay-period will thus always be at least the base rate of that employee times the number of hours worked (plus overtime for extra hours worked), which is the minimum employee compensation amount, and will be no more than the unit rate compensation amount for the projects completed plus with any bonus payments, reduced by the amount of any accrued debit account amount that the employee may have.

As shown specifically in the Examples, if the employee works a 40-hour week (no overtime), employee remuneration is calculated as follows: the number of units worked times the company and employee factors is used, but in no case is the employee paid less than the employee's particular base rate times the number of hours actually worked (Example 1). If the employee completes a project during those 40 hours that has a greater unit rate compensation amount than he would be paid using a standard hourly wage, and if the employee does not have a debit account amount, the employee will be paid more than the minimum employee compensation amount.

Each employee is paid any excess over his base rate in his regular (e.g., weekly) pay-check, such as being paid the entire $600 unit rate compensation amount, even though he worked only 40 hours at a base rate of $10/hour to complete the $600-project. If, however, the employee uses the 40-hour week and only completes a $300-project, he will be paid the $400 minimum employee compensation amount, and his debit account amount will be adjusted by $100 to reflect the fact that his performance was sub-standard. That balance in the debit account will stay negative, but will not affect the employee's pay-check until the employee has a positive week (completes a project at an effective rate that would yield a higher per-hour salary for a particular project, based on the unit rate for that project). If a full deduction of the debit account amount would lower the employee's earnings for that pay period below his minimum employee compensation amount, the full deduction will not be made and only a portion of that amount will be subtracted from his pay-check, so that the employee still receives his minimum employee compensation amount, and will continue to have a balance in his debit account amount.

The debit account amount for each employee is calculated and continually updated each pay-period. The balance carried over between pay periods is only for debit account amounts that can be applied to future pay periods when the employee earns bonus amounts. For each pay period, the employee is paid all bonus amounts owed for that pay period minus any carried over debit account amounts, so that no bonus amounts are carried over.

The invention herein also provides for paid time off (PTO), which may be calculated on the basis of the number of hours worked by the employee, on the amount paid to the employee or in any other manner. The rate of accrual of PTO may be based on either all the hours actually worked or on the gross amount paid to the employee (a floating rate of accumulated PTO per week that will vary from week to week) or a set-rate of a certain amount of PTO per week an employee has worked 40 hours. In either case, the employee will earn paid time off each pay period as calculated by establishing the number of annual hours that the company wishes to offer as vacation time and/or sick time, divided by the number of pay periods per year. For each period worked, the PTO will be reported as due the employee. An employee that has two weeks' vacation (80 hours) and five sick days (40 hours) would accrue 2.31 hours per week.

The invention further provides a method of employee management for provision of services on the projects completed, comprising:

a) utilizing an invoice containing information on the projects completed;

b) keeping a time sheet for each employee comprising information on time spent on each project by the employee;

c) determining a minimum employee compensation amount for each project undertaken by each employee based on multiplying a base rate for the employee times the number of hours worked by the employee on the project;

d) utilizing information on each employee and each employee's invoices and time sheets, together with information on units allocated to each project, a company factor, and an employee factor for each employee to determine a unit rate compensation amount for each employee;

e) determining whether the employee has an outstanding debit account amount for previous pay periods; and f) determining the difference between the minimum employee compensation amount and the unit rate compensation amount for each employee, and comparing said difference for each employee with the outstanding debit account amount for that employee, to determine the employee's pay for the pay period and to determine whether the employee's debit account amount should be adjusted.

Typically an invoice, also termed a job work order, for example in the plumbing industry, includes customer information (name, address, phone, equipment, and other data), information on the reported trouble for which service is required, the employee's diagnosis and the flat rate repair costs, the source from which the price came, the acceptance or decline from the customer, travel time, vehicle mileage, the sale amount, the method of payment, customer signature, employee name and/or number, sales tax, actual job starting and completion times, amount of regular time and overtime, and any service agreement information. Service ticket control numbers, mandated environmental refrigerant information, equipment readings and terms and conditions may also be included. Clearly, the type of information on the job work order would vary with industry and with individual companies.

The employee timesheet would typically include job numbers, invoice or work order numbers, the amount of sales quoted by the employee, and the amount of sales made by the employee.

Information on each employee that is typically entered into the system includes employee name, address, social security number, employee number, employee base rate, employee factor (as discussed herein), marital status, dependants, additional tax information on withholding, paid-time off accrued and taken and vacation status.

No matter how the employee's compensation is calculated for projects completed for which a customer can be billed, the employee may also be paid for extra time or other bonuses at the option of the employer company.

This method of the invention may also include producing standard reports for particular employees, services provided and customers, tracking earned time off by each employee based on actual hours worked by the employee or on gross pay paid to the employee, tracking gasoline usage by employees, providing a tool account from which employees may earn credit toward tool purchase or other job enhancement features, providing a payroll module for producing paychecks, determining, withholding and paying payroll taxes, and any required fees, providing a sales tax module for determining and paying sales tax due to governmental authorities, providing a dispatch module to enable tracking of completion of particular employee services to enable timely assignment of employees to new projects, providing benchmarks to gauge company performance against the company's own past business performance and performance by other similar companies, and/or providing availability of additional compensation including commissions, bonuses and spiff.

The features of the present invention will be more clearly understood by reference to the following examples, which are not to be construed as limiting the invention.

EXAMPLE 1

Unit Rate Compensation Amount of $600.00—No Overtime

For a project for which the unit rate compensation amount is $600 for a particular employee, an employee, designated Employee A (in this and the following examples, it is assumed that the employee factor is 1), whose base rate is $10/hour and who takes 40 hours to complete the project, would normally be paid $400 if paid strictly on an hourly basis, the minimum compensation rate amount. Under the invention, however, if Employee A does not have a debit account amount, his unit rate compensation amount will be $600.00, which is an effective $15.00 per hour ($600 divided by 40 hours). If Employee A had completed the work in only 30 hours, his effective rate of pay would be $20.00 per hour, double his base rate.

EXAMPLE 2

Unit Rate Compensation Amount of $600.00—With Overtime

For a project having a unit rate of $600, if Employee B who has a base rate of $10/hour takes 45 hours to complete the work, he would be paid $475 if only paid at his hourly rate (the minimum employee compensation amount), whereas under the invention, he would be paid $600 for that period using the unit rate, providing that there he had no negative debit account amount. His effective base rate under the invention for the week would be $12.63 for 40 hours, plus 5 hours of overtime at time-and-a-half for effectively 47½ hours. The formula for calculating hourly rate and pay can be adjusted for changes in applicable labor laws and other regulatory requirements.

EXAMPLE 3

Unit Rate Compensation Amount of $300.00—No Overtime

For a project having a unit rate of $300, if an employee, designated Employee C, whose base rate is $10/hour takes 40 hours to complete the project, he is still paid $400, on a strictly hourly basis, the minimum compensation rate amount. Because this exceeds the unit rate compensation amount, he will not receive any additional amounts for that project as did the employee in Example 1. Furthermore, the excess ($100) paid to the employee over the minimum compensation rate amount of $300 will be reflected in a $100 debit account amount.

EXAMPLE 4

Unit Rate Compensation Amount of $600.00—No Overtime—Employee With Debit Account Amount If after Employee C completes the project of Example 3, he works on a new project with a unit rate compensation amount of $600 and completes the new project in 40 hours, his minimum compensation rate amount for the new project will be $400 (40 hours×$10/hr). If Employee C did not have a debit account amount, he would receive the entire $600 for the new project; however, since he has a $100 debit account amount, $100 will be deducted from his pay, and he will receive only $500 for the new project. Alternatively, if Employee C had completed the new project in 60 hours, spread over 2 weeks so there would be no overtime, the employee would be paid $600, at his base rate, and he would still have a $100 debit account amount (which would be applied against later week's projects when the employee worked at a faster rate than the rate factored into the unit rate).

EXAMPLE 5

Paid Time Off—Hourly Basis

An employee works 40 hours in a week and earns a number of hours to be accrued toward vacation and sick time. If a company paid two weeks (80 hours) vacation and one week (40 hours) sick time per year, for each 40 hours worked, the employee earns 2.31 hours PTO per week ((80+40) divided by 2080 (work hours per year).

EXAMPLE 6

Paid Time Off—Gross Pay Basis

An employee earns $600 for pay as computed by the system of the invention for 40 hours worked, yielding an effective rate of $15.00 per hour. Dividing $600 by 15 yields 40 hours of worked time to accrue a number of hours as designated by vacation and sick pay. Should an employee earn $600 for an actual 35 hours worked, but 40 hours of production (the employee will accrue 40 hours of worked time for use to compute the paid time off hours.

EXAMPLE 7

Determination of Company's Adjusted Sales Amount

A typical worksheet that may be used to determine the company factor, with an example of actual calculations is described herein. The company first lists the number of company employees, e.g., 10, and multiplies this times the average billable hours per week per technician (e.g., 25) times the number of weeks per year (52) to yield the company's total annual productive hours (e.g., 13,000) in this example. To determine the company's annual labor service revenue, the annual productive hours are multiplied by the average length of a service call in hours (e.g., 1 hour) times the average amount the company bills for service calls (e.g., $100), yielding $1,300,000 revenue in the example. To this amount is added amount of the annual parts sales, $650,000 in the example, resulting in a total adjusted service revenue of $1,950,000 for the example. This revenue is reduced by the product of the anticipated gross margin (e.g., 50%) times the annual parts sales, to yield a unit rate adjusted sales amount of $1,625,000 in this example. Utilizing the unit rate adjusted sales amount, the company can determine the percentage of sales that is profit, overhead, expenses, employee costs, vacations and holidays, non-productive time, overtime and call-back expense as discussed below in Example 8, and thence determine the company factor.

EXAMPLE 8

Determination of Company Factor or Company-wide Comp Rate

In the preferred way of determining the company factor, the percentage allocated by the company to each of standard expense categories, an example of which follows, is subtracted from 100%, resulting in a percentage by which each unit of work performed by the company's employees is multiplied to determine unit rate compensation for the employees. Multiplication of each percentage of the various types of expenses given below times the hourly service charge yields information on how each hour's receipts are to be allocated.

Thus, for a typical company, the percent desired profit for a particular service department might be 10%; the percent overhead, such as rent, utilities, office expenses and office salaries, professional fees and the like might be 40%; the percent truck and tool expense such as leases, depreciation, insurance, supplies, repairs, 8%; the employee cost (payroll and benefit, taxes) 5%; employees' vacation and holidays 1%; employee non-productive or "extra" time during which an employee is paid but which cannot be charged to a particular customer, 5%; service overtime (total of all service department overtime divided by department sales), 5%; and call back expense (cost of services performed but which cannot be charged to a customer, such as for shoddy work or employee oversights), 1%, for a total of 75%. The company would then be able to use the remaining 25% as a company factor, or $25 if the company labor sell rate per hour is $100. In some instances, depending on applicable regulations and company policies, such categories as service overtime and call back expense may be included in the Company Factor (e.g., should the computation yield that the labor contribution is 25%, the overtime costs comprise 5% and the callbacks comprise 1%, and the labor sell rate is $100, 25% times $100 yields a $25 labor, $5 overtime and $1 callback, for a total of a $31.00 Comp Rate). This company factor would be expect to change with time, e.g., as a company became more or less profitable, had changes in overhead, and the like.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A method of determining employee compensation for services rendered by the employee, comprising:

a) providing an interface to an accessible database for storing data on units of estimated labor costs for providing services on each of one or more projects;

b) providing a compensation base rate for each employee;

c) determining a minimum employee compensation amount for each project undertaken by each employee based on the employee's compensation base rate times the number of hours worked by the employee on the project;

d) determining a unit rate compensation amount for each project undertaken by each employee utilizing units allocated to each project, and factors specific for the employee's employer company and to the employee;

e) determining whether each employee has an outstanding debit account amount related to previous work for which the employee was paid an amount greater than the employee would have earned if the employee was paid the unit rate compensation amount;

f) subtracting the minimum employee compensation amount from the unit rate compensation amount to yield a bonus amount; and g) if the bonus amount is positive and greater than the debit account amount, paying the employee the unit rate compensation amount minus the debit account amount, but paying the employee no lower than the minimum employee compensation amount; and h) if the bonus amount is positive and less than the debit account amount, paying the employee the minimum employee compensation amount, and adjusting the debit account amount for the employee to be equal to the outstanding debit account amount minus the bonus amount; and i) if the bonus amount is positive and equal to the debit account amount, paying the employee the minimum employee compensation amount, and adjusting the debit account amount for the employee to be zero; and j) if the bonus amount equals zero, paying the employee the minimum employee compensation amount; and k) if the bonus amount is negative, paying the employee the minimum employee compensation amount and adjusting the debit account amount by adding the bonus amount to the debit account amount.

2. The method of claim 1, further comprising adjusting the unit rate compensation amount upward to take account of extra services provided by the employee in addition to services required to complete projects.

3. The method of claim 1, wherein the determination of the unit rate compensation amount takes into account time worked for overtime to be paid at time-and-a-half.

4. The method according to claim 1, further comprising producing standard reports for particular employees, services provided and customers.

5. The method according to claim 1, further comprising tracking earned time off by each employee based on actual hours worked by the employee or on gross pay paid to the employee.

6. The method according to claim 1, further comprising tracking gasoline usage by employees.

7. The method according to claim 1, further comprising providing a tool account from which employees may earn credit toward tool purchase or other job enhancement features.

8. The method according to claim 1, further comprising providing a payroll module for producing paychecks, determining, withholding and paying payroll taxes, and any required fees.

9. The method according to claim 1, further comprising providing a sales tax module for determining and paying sales tax due to governmental authorities.

10. The method according to claim 1, further comprising providing a dispatch module to enable tracking of completion of particular employee services to enable timely assignment of employees to new projects.

11. The method according to claim 1, further comprising providing benchmarks to gauge company performance against the company's own past business performance and performance by other similar companies 12. The method according to claim 1, further comprising providing availability of additional compensation including commissions, bonuses and spiff.

* * * * *